United States Patent
Karasek et al.

(10) Patent No.: US 8,630,035 B2
(45) Date of Patent: Jan. 14, 2014

(54) MODULAR SET OF DEVICES FOR OPTICAL AMPLIFICATION OF SIGNAL BY RAMAN FIBER AMPLIFIER

(75) Inventors: Miroslav Karasek, Kolin (CZ); Josef Vojtech, Prague (CZ); Jan Radil, Prague (CZ)

(73) Assignee: Cesnet Zajmove Sdruzeni Pravnickych OSOB, Prague (CZ)

( * ) Notice: Subject to any disclaimer, the term of this patent is extended or adjusted under 35 U.S.C. 154(b) by 90 days.

(21) Appl. No.: 13/121,810

(22) PCT Filed: Oct. 2, 2009

(86) PCT No.: PCT/CZ2009/000116
§ 371 (c)(1),
(2), (4) Date: Mar. 30, 2011

(87) PCT Pub. No.: WO2010/040324
PCT Pub. Date: Apr. 15, 2010

(65) Prior Publication Data
US 2011/0176201 A1  Jul. 21, 2011

(30) Foreign Application Priority Data

Oct. 6, 2008 (CZ) .............. PV 2008-596

(51) Int. Cl.
| | |
|---|---|
| *H01S 3/09* | (2006.01) |
| *H01S 3/067* | (2006.01) |
| *H04B 10/29* | (2013.01) |
| *H01S 3/30* | (2006.01) |
| *H01S 3/094* | (2006.01) |
| *H01S 3/091* | (2006.01) |

(52) U.S. Cl.
CPC ........... *H01S 3/302* (2013.01); *H01S 3/094046* (2013.01); *H01S 3/06754* (2013.01); *H01S 3/0912* (2013.01); *H01S 2301/03* (2013.01); *H01S 2301/04* (2013.01); *H01S 2301/06* (2013.01)
USPC ........................ 359/334; 359/341.3

(58) Field of Classification Search
CPC ....................................... H04B 10/17
USPC ................... 359/334, 341.3; 398/75
See application file for complete search history.

(56) References Cited

U.S. PATENT DOCUMENTS 5,265,110 A * 11/1993 Naya ............................. 372/21
6,344,922 B1 * 2/2002 Grubb et al. .................. 359/334
(Continued)

FOREIGN PATENT DOCUMENTS

CN       1767611 A       5/2006
EP       1 018 666 A1    7/2000
(Continued)

OTHER PUBLICATIONS

International Search Report (PCT/ISA/210) dated Mar. 2, 2010.
(Continued)

*Primary Examiner* — Mark Hellner
*Assistant Examiner* — Ari M Diacou
(74) *Attorney, Agent, or Firm* — Buchanan Ingersoll & Rooney PC

(57) ABSTRACT

Modular set is formed by optical module interconnected with control module of electronic system. Optical module is formed by at least two pairs of laser diodes connected in series and including Peltier cooler and thermistor, which are connected to inputs of polarizing fiber combiners, and depolarized outputs of these polarizing fiber combiners are connected to inputs of a wavelengths combiner. Module of the electronic system is formed by a control microprocessor interconnected with direct current power supply source, with PID regulators of laser diodes temperature, a display indicating temperature of individual laser diodes and current flowing through them, and a control panel. To the microprocessor of the module of the electronic system is connected a gate array and to this gate array are connected generators of current impulses, which do not overlap in time, and their widths, repetition frequencies and amplitudes are adjustable, while the number of generators of current impulses equals to the number of pairs of laser diodes and their outputs are connected via power stages to pairs of laser diodes connected in series, and where to the power stages is connected an analogue/digital converter, which is connected also to the microprocessor.

1 Claim, 1 Drawing Sheet

(56) References Cited

U.S. PATENT DOCUMENTS

| | | | |
|---|---|---|---|
| 6,611,368 B1* | 8/2003 | Grant et al. | 359/334 |
| 6,813,067 B1* | 11/2004 | Birk et al. | 359/334 |
| 6,903,863 B1* | 6/2005 | Carniel et al. | 359/334 |
| 7,042,632 B2* | 5/2006 | Krummrich | 359/334 |
| 7,116,470 B2* | 10/2006 | Martinelli et al. | 359/334 |
| 7,242,519 B2* | 7/2007 | Torii et al. | 359/334 |
| 8,213,078 B2* | 7/2012 | Hiraizumi | 359/341.41 |
| 2002/0141008 A1* | 10/2002 | Chbat et al. | 359/110 |
| 2002/0149838 A1* | 10/2002 | Wang et al. | 359/334 |
| 2002/0154356 A1* | 10/2002 | Krummrich | 359/124 |
| 2002/0154390 A1* | 10/2002 | Shieh et al. | 359/341.33 |
| 2002/0181859 A1* | 12/2002 | Clark et al. | 385/27 |
| 2003/0081307 A1 | 5/2003 | Fludger et al. | |
| 2003/0117697 A1 | 6/2003 | Krummrich | |
| 2003/0133179 A1* | 7/2003 | Islam et al. | 359/334 |
| 2003/0152390 A1* | 8/2003 | Stewart et al. | 398/135 |
| 2003/0179787 A1* | 9/2003 | Woodley | 372/20 |
| 2003/0210457 A1 | 11/2003 | Emori et al. | |
| 2004/0022282 A1* | 2/2004 | Lano et al. | 372/32 |
| 2004/0032641 A1 | 2/2004 | Namiki et al. | |
| 2004/0086279 A1* | 5/2004 | Sakamoto et al. | 398/177 |
| 2004/0100683 A1* | 5/2004 | Krummrich | 359/333 |
| 2005/0024712 A1* | 2/2005 | Hiraizumi et al. | 359/334 |
| 2005/0122570 A1 | 6/2005 | Chang et al. | |

FOREIGN PATENT DOCUMENTS

| | | | |
|---|---|---|---|
| EP | 1 148 666 A2 * | 10/2001 | H04B 10/17 |
| EP | 1 298 766 A1 | 4/2003 | |
| EP | 1 317 032 A2 | 6/2003 | |
| EP | 1 349 417 B1 | 8/2006 | |
| EP | 1 030 532 B1 | 10/2006 | |
| EP | 1 317 083 B1 | 2/2009 | |
| WO | WO 2007/009915 A2 | 1/2007 | |

OTHER PUBLICATIONS

Written Opinion (PCT/ISA/237) dated Mar. 2, 2010.

Miroslav Karásek et al., "Power transients in time-division multiplexed discrete Raman fibre amplifier", Optics Communications, North-Holland Publishing Co., Amsterdam, NL, vol. 282, No. 14, Jul. 15, 2009, pp. 1-15.

Miroslav Karasek et al., "Large Signal Model of TDM-Pumped Raman Fiber Amplifier", IEEE Photonics Technology Letters, vol. 17, No. 9, Sep. 2005, pp. 1848-1850.

M. Karasek et al., "Surviving Channel Power Transients in TDM-Pumped Lumped Raman Fiber Amplifier", Institute of Photonics and Electronics, Academy of Sciences of the Czech Republic, Mar. 22, 2009, 3 pages.

* cited by examiner

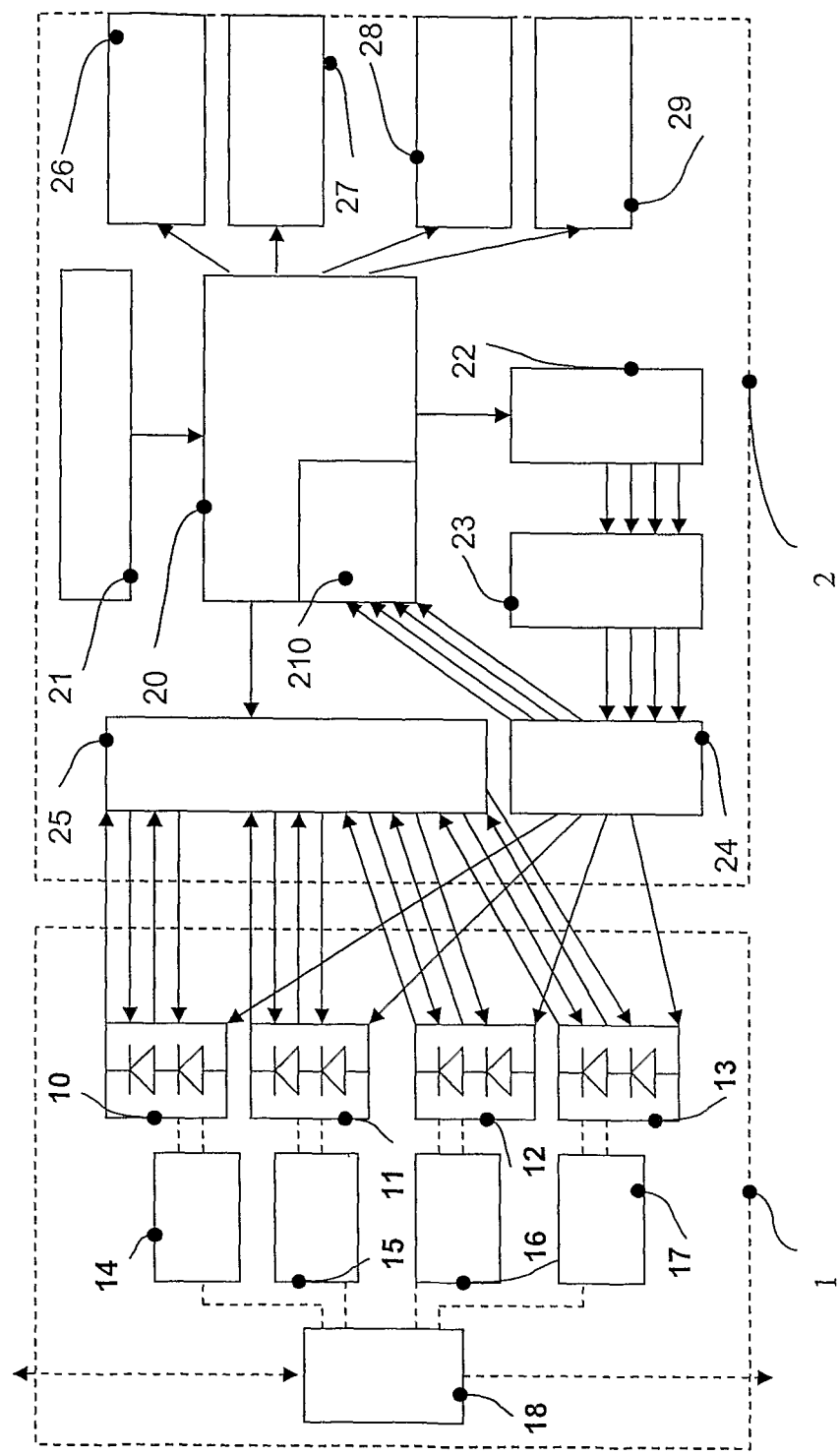

MODULAR SET OF DEVICES FOR OPTICAL AMPLIFICATION OF SIGNAL BY RAMAN FIBER AMPLIFIER

FIELD OF THE INVENTION

Presented solution deals with a modular set of devices for optical amplification of signal using Stimulated Raman Scattering and belongs to the sphere of telecommunication technology and services.

DESCRIPTION OF THE BACKGROUND ART

At present, optical communication systems most commonly use fiber amplifiers based on Erbium-doped fibers. Characteristics of such amplifiers limit their performance to wavelength bandwidth 1525 nm to 1560 nm; when modified, their functionality can be expanded to bandwidth 1570 to 1600 nm. Growing demands for volumes of transmitted information however require exploitation of other wavelength bands where optical fibers show low losses. Therefore, in the last decade and especially in connection with development of powerful semiconductor laser diodes, the attention has been focused on utilization of Stimulated Raman Scattering for scattered amplification directly in the transmission fiber. Such fiber amplifiers are called Raman fiber amplifiers.

Advantage of Raman fiber amplifiers is that they use transmission medium as an active environment. This means that in contrary to optical amplifiers based on fibers doped by rare earth elements they do not need special active fiber, which would predetermine their spectral range of possible application. Another advantage is that the spectral area, in which the Raman fiber amplifiers can be used, is flexible and is determined only by so-called Raman downshift between pump and signal waves; this downshift for silica fibers is roughly 12 THz. Raman fiber amplifiers bandwidth is moreover defined by the number of pump wavelengths and therefore it is not determined by spectral properties of chosen special fiber doped by rare earth elements. Using 4 pump wavelengths with suitable spectral deployment allows to achieve bandwidth broader than 80 nm, which is impossible with commonly used Erbium-doped fiber amplifiers.

As a source of pump radiation, current broadband Raman fiber amplifiers use frequency-multiplexed power laser diodes operating in continuous mode. In order to suppress pump waves' amplitude noise transfer to signal waves, so-called contra-directional pumping of Raman fiber amplifiers is usually used. This means that pump waves spread from the opposite end of the transmission fiber than signal waves. Suitable selection of wavelengths and power rating of individual pump diodes allows to achieve rather flat spectral response to signal amplification within the required frequency bandwidth. Shortcoming of these amplifiers is that transfers of energy between individual pump waves occur due to Raman interactions between them, causing higher-frequency pump waves to amplify lower-frequency pump waves, which as a result protrude with higher power to the other, signal, side of the transmission fiber. Resulting effect is that the optical signal-to-noise ratio almost linearly improves with increasing signal wavelength. At broadband Raman amplifiers, optical signal-to-noise ratio difference between signals at both ends of amplification spectrum may reach even several decibels despite suitable selection of pump waves frequencies and power ratings, which allows achieving rather flat spectral response to amplification with maximum ripple lower than few tenths of decibel. When multiple Raman fiber amplifiers are cascaded, the effect of linearly improved optical signal-to-noise ratio adds up and the difference between signals at the opposite ends of spectrum may be unacceptably high and cause higher error rates in transfer of information at the shortwave spectrum side.

SUMMARY OF THE INVENTION

Above-mentioned shortcomings of continuously pumped broadband Raman fiber amplifiers are removed by a modular set of devices for Raman scattered optical amplification of signal with time-multiplexed pumping according to the presented solution. The set consists of optical module interconnected with control module of electronic system. Optical module is formed by at least two pairs of laser diodes connected in series, where each of them is equipped with integrated Peltier thermo electric cooler and thermistor. These laser diodes in each single pair generate radiation with equal wavelength, but wavelengths of each pair are different. Pairs of laser diodes are subsequently connected to inputs of polarization fiber combiners, and depolarized outputs of these polarization fiber combiners are connected to inputs of a wavelengths combiner. This wavelengths combiner has additionally one fiber output for bidirectional connection to optical fiber route and second fiber output providing output of amplified signal to another processing device. These two outputs may be preferably terminated by optical connectors at the panel of optical module. Control module of the electronic system is formed by a control microprocessor interconnected with direct current power supply source, with PID (Proportional, Integral, Derivative) regulators of laser diodes temperatures, number of which equals to the number of laser diodes, with inputs connected to thermistors and outputs connected to Peltier coolers integrated in laser diodes; further, the control module includes a display indicating temperature of individual laser diodes and current flowing through them, and a control panel. Principle of the new solution is that a gate array is connected to the electronic system module's microprocessor and to this gate array are connected generators of current impulses, which do not overlap in time, it means that at a given moment only a single impulse is present, while widths, repetition frequencies and amplitudes of these impulses are adjustable. The widths, repetition frequencies and amplitudes of these impulses are adjustable by microprocessor, which is equipped with appropriate software ensuring that impulses do not overlap in time domain.

Number of generators equals to the number of pairs of laser diodes. Outputs of current impulses generators are connected via power stages to pairs of laser diodes connected electrically in series. An analogue to digital converter is connected to power stages; this converter is simultaneously connected to the microprocessor, and in a preferable embodiment it is integrated in the microprocessor as its part.

Very frequently, an interface module will be connected to the microprocessor providing communication via standard interface RS-232 and/or an interface module formed by a standard serial bus USB.

In another possible preferable embodiment, the control microprocessor includes integrated 24 bit analogue/digital converter.

In addition, it is advantageous, if the control panel of the microprocessor is equipped with pushbuttons and digital potentiometer allowing recalling and store parameters of current impulses set values, such as their width, repetition frequency and amplitude.

Individual modules, i.e. optical module and module of the electronic system, allow installation into standard IT rack.

The principle of the new solution therefore is the fact that optical module formed by several pairs of power laser diodes, each pair with different wavelength of generated radiation, does not operate in continuous mode, but each pair of laser diodes, electrically connected in series, operates in impulse mode. Simultaneously, the feed impulses to individual pairs of laser diodes do not overlap in time, which means that at any moment the pump power in given place of optical fiber belongs always to a single frequency only. Thus, no interaction and mutual transfer of energy between pump waves with different frequencies may occur and all pump diodes transfer their power to signal waves only. This removes also uneven protrusion of pump waves to transmission fiber, thus eliminating the linear function of optical signal-to-noise ratio. Moreover, this solution eliminates also other interactions between pump waves caused by non-linear refraction index of transmission fiber.

BRIEF DESCRIPTION OF THE DRAWINGS

Principle of the new solution is explained below and described by the attached drawing, which shows a block diagram of the device. It shows a diagram of actual device, which is currently undergoing testing procedures.

DESCRIPTION OF THE PREFERRED EMBODIMENTS

Modular set of devices for optical amplification of signal by Raman fiber amplifiers with time-multiplexed pumping is formed by optical module 1 and module 2 of the electronic system. Solid lines in the attached drawing indicate electric connections and dashed lines indicate optical connections.

Optical module 1 consists of at least two pairs of power laser diodes electrically connected in series. In presented example, these pairs are four in total, i.e. the first pair 10, the second pair 11, the third pair 12 and the fourth pair 13. Each laser diode is equipped with Peltier cooler and thermistor. Laser diodes in each pair generate radiation of equal wavelength, while wavelengths of individual pairs are different. Pairs 10, 11, 12 and 13 of laser diodes are subsequently connected to inputs of relevant polarization fiber combiners, i.e. with the first polarization fiber combiner 14, the second polarization fiber combiner 15, the third polarization fiber combiner 16 and the fourth polarization fiber combiner 17, while depolarized outputs of these polarization fiber combiners are connected to inputs of wavelengths combiner 18. This wavelengths combiner 18 has one fiber output for bidirectional connection to optical fiber route and second fiber output providing output of amplified signal to another processing device.

Control module 2 of the electronic system is formed by a control microprocessor 20 with integrated analogue to digital converter 210. This microprocessor 20 is connected with direct current power supply source 21 and with PID regulators 25 of laser diodes temperatures, number of which equals to the number of laser diodes and their inputs are connected to thermistors and outputs are connected to Peltier coolers integrated in laser diodes. Further, the microprocessor 20 is interconnected with a display 26 indicating temperature of individual laser diodes and current flowing through them, and with a control panel 27. To the microprocessor 20 of the module 2 of the electronic system is connected a gate array 22. To this gate array 22 are connected generators 23 of current impulses, which do not overlap in time, while their widths, repetition frequencies and amplitudes are adjustable. Impulse duration controls gain flatness and pitch between impulses controls amplification level of the device. Number of generators 23 of current impulses equals to the number of pairs 10, 11, 12 and 13 of laser diodes, here therefore four generators are implemented. Their outputs are connected via power stages 24 to pairs 10, 11, 12 and 13 of laser diodes connected in series, which may be switched on against ground or against positive pole of the direct current power supply source 21 depending on the power stages 24 design. In case the power stages 24 are equipped with N-type switches, anodes of pairs 10, 11, 12 and 13 are connected to positive pole of the direct current power supply source 21 and the power stages 24 switch cathodes of pairs 10, 11, 12 and 13 against ground. In case the power stages 24 are equipped with P-type switches, cathodes of pairs 10, 11, 12 and 13 are connected to ground and the power stages 24 switch the positive pole of the direct current power supply source 21 to anodes of pairs 10, 11, 12 and 13. Power stages 24 are also interconnected with inputs of analogue to digital converter 210 of the microprocessor 20.

The first pair 10, the second pair 11, the third pair 12 and the fourth pair 13 of laser diodes, in given example, emit in sequence radiation at wavelengths 1430 nm, 1445 nm, 1460 nm and 1475 nm with maximum power bound to the optical fiber 250 mW. In this case laser diodes Furukawa FOL 1404QQO-617 were used. Each laser diode connected in series generates radiation of equal wavelength and this radiation is depolarized in relevant polarization fiber combiner corresponding to given pair 10, 11, 12, 13 of laser diodes, i.e. in the first to fourth fiber polarizing combiner 14, 15, 16 and 17. Wavelengths radiated by individual pairs 10, 11, 12, 13 of laser diodes are selected such to allow Raman amplification in desired frequency bandwidth of signals to be amplified. Optical power at outputs of individual fiber combiners 14, 15, 16 and 17 is combined in the wavelengths combiner 18, in this case Oplink QCPC14SWD was used, and its output is lead via optical connector to the panel of the optical module 1, to which optical fiber is also lead, selecting from the spectrum only the part containing transmitted signals. This includes the fiber output serving for bidirectional connection to optical fiber route and the fiber output providing output of amplified signal to another processing device. Here, the signals were amplified in bandwidth 1520 nm to 1580 nm.

Module 2 of the electronic system consists of required number of generators 23 of current impulses with variable width and variable repetition frequency in order of hundreds of kHz. Current impulses amplitude may also be adjusted in the range of up to several amperes depending on type of applied laser diodes. Number of generators 23 of current impulses corresponds to the number of applied pairs of laser diodes. Impulses of individual generators 23 of current impulses are off-set in time and do not overlap each other. The system includes PID regulators 25 of laser diodes temperature. The whole system is controlled by microprocessor 20 SILABS series C8051F350 with integrated 24-bit analog/digital converter. Microprocessor 20 ensures all necessary functions of generators 23 of current impulses, controls and simultaneously also by means of integrated analog/digital converter 210 it accurately measures the amplitude of drive impulses as well as the mean value of laser current. This analog/digital converter 210 may also be designed as a standalone block, however it preferably should be part of the microprocessor 20. Impulse amplitudes for individual laser diodes with different wavelengths of emitted radiation may be adjusted separately, thus allowing achieving flat spectral response of signal amplification. Precise timing of impulses as such here is ensured by a gate array 22, in this example Xilinx XC5236, which via output power stages 24 drives laser diodes with different wavelengths of emitted radiation. It is possible to generate current impulses of variable width in the range 0.8-5 μs and repetition frequency 50-300 kHz with adjustable current amplitude 0.8-4 A. Impulses generated by individual generators are off-set in time and do not overlap each other. Communication with user is provided by a three-row LCD display 26 on the front panel, control pushbuttons and digital potentiometer allowing precise setting of required values of current and temperature. Combinations of pre-set values of impulses, width, repetition frequency and impulse amplitude for individual pairs 10, 11, 12 and 13 laser diodes, may be stored in the microprocessor 20 memory. Control microprocessor 20 provides connection of input/output interface modules, specifically interface module 28 for communication via standard fixed interface RS-232 and/or interface module 29 formed by standard serial bus USB, which ensures necessary and comfortable control and management of the device and will also allow easy integration of the system into already existing optical network infrastructure. Electronic system is supplied by direct current power supply source 21 with voltage 24 V. Module 2 of the electronic system is interconnected with the optical module 1 by corresponding number of cables providing impulse feeding for laser diodes and their temperature stabilization.

The solution is designed as modular set using standardized and commercially available building components. Active optoelectronic elements, i.e. power laser diodes, are connected with passive optical elements, i.e. polarizing fiber combiners 14, 15, 16 and 17 and wavelengths combiner 18, by welded fiber outputs and both are located in a standard rack cabinet. Module 2 of the electronic system is also built in the same rack cabinet and it is connected to optical module 1 in given example by twelve cables, where four cables are intended for impulse feeding of laser diodes pairs and eight cables serve for temperature stabilization of eight laser diodes.

INDUSTRIAL APPLICABILITY

Industrial applicability of this solution is very good, as it can be used both on national as well as international optical routes. Application in laboratory environment is a matter of fact. In contrary to commonly used Erbium-doped fiber amplifiers it allows to increase distance between repeaters implemented in the transmission system.

The invention claimed is:

1. Modular set of devices for optical amplification of signal by Raman fiber amplifier formed by optical module interconnected with control module of electronic system where the optical module consists of at least two pairs of laser diodes connected in series, where each of them is equipped with integrated Peltier cooler and thermistor and where these laser diodes in each single pair generate radiation with equal wavelength, while wavelengths of each pair are different, and these pairs of laser diodes are subsequently connected to inputs of polarization fiber combiners, and depolarized outputs of these polarization fiber combiners are connected to inputs of wavelengths combiner, which has one fiber output for bidirectional connection to optical fiber route and second fiber output providing output of amplified signal to another processing device, and where control module of the electronic system is formed by a control microprocessor with built-in A/D converter interconnected with direct current power supply source, with gate array with PID regulators of laser diodes temperature, number of which equals to the number of laser diodes, inputs of laser diodes are connected to thermistors and outputs are connected to Peltier coolers integrated in laser diodes, by a display indicating temperature of individual laser diodes and current flowing through them, and a control panel wherein to the gate array are connected generators of current pulses and their widths, repetition frequencies and amplitudes are adjustable and the outputs of these generators are mutually shifted in time in order to eliminate non-linear interactions among pulses and flatten the optical signal to noise OSNR spectral characteristic while the number of generators of current pulses equals to the number of pairs of laser diodes and their outputs are connected via power stages to pairs of laser diodes connected in series, where each laser diode is connected with input of respective polarization fiber combiner and where to the power stages are connected an analogue/digital converter, which is connected also to the microprocessor.

* * * * *